(12) United States Patent
Untiedt

(10) Patent No.: US 11,230,045 B2
(45) Date of Patent: Jan. 25, 2022

(54) METHOD FOR OVERMOLDING AT LEAST ONE LINE

(71) Applicant: Christoph Untiedt, Klein Berssen (DE)

(72) Inventor: Christoph Untiedt, Klein Berssen (DE)

(73) Assignee: LEONI KABEL GMBH, Nuremberg (DE)

(*) Notice: Subject to any disclaimer, the term of this patent is extended or adjusted under 35 U.S.C. 154(b) by 308 days.

(21) Appl. No.: 16/181,549

(22) Filed: Nov. 6, 2018

(65) Prior Publication Data
US 2019/0134873 A1 May 9, 2019

(30) Foreign Application Priority Data
Nov. 9, 2017 (DE) .......................... 102017219923.7

(51) Int. Cl.
| | | |
|---|---|---|
| *B29C 48/25* | (2019.01) | |
| *B29C 45/14* | (2006.01) | |
| *H02G 1/14* | (2006.01) | |
| *H02G 15/013* | (2006.01) | |
| *H01R 13/52* | (2006.01) | |
| *H01R 43/00* | (2006.01) | |
| *B29C 48/154* | (2019.01) | |
| *B29C 48/06* | (2019.01) | |
| *H01R 13/504* | (2006.01) | |

(Continued)

(52) U.S. Cl.
CPC ...... *B29C 48/254* (2019.02); *B29C 45/14065* (2013.01); *B29C 45/14385* (2013.01); *B29C 45/14418* (2013.01); *B29C 45/14426* (2013.01); *B29C 48/06* (2019.02); *B29C 48/154* (2019.02); *H01R 13/504* (2013.01); *H01R 13/5205* (2013.01); *H01R 13/5216* (2013.01); *H01R 43/005* (2013.01); *H02G 1/145* (2013.01); *H02G 15/013* (2013.01); *B29L 2031/36* (2013.01); *B33Y 80/00* (2014.12)

(58) Field of Classification Search
CPC ..... B29C 48/254; B29C 48/154; B29C 48/06; H01R 13/504; B33Y 80/00; B29L 2031/36
See application file for complete search history.

(56) References Cited

U.S. PATENT DOCUMENTS

| | | |
|---|---|---|
| 4,415,518 A | 11/1983 | Pochurek et al. |
| 6,866,718 B2 | 3/2005 | Chujo et al. |

(Continued)

FOREIGN PATENT DOCUMENTS

| | | |
|---|---|---|
| CN | 106941024 A | 7/2017 |
| DE | 102004034102 A1 | 2/2006 |

(Continued)

*Primary Examiner* — Yung-Sheng M Tsui
(74) *Attorney, Agent, or Firm* — Tarolli, Sundheim, Covell & Tummino LLP

(57) ABSTRACT

A method for overmolding at least one line (40) comprises the steps:
receiving the at least one line (40) in an opening (14) of a sealing element (10), wherein the opening (34) of the sealing element (10) is substantially complementary in shape to a peripheral geometry of the at least one line (40);
mounting the sealing element (10) on a mold (30);
overmolding the at least one line (40) received in the sealing element in a region (42) that is adjacent to the sealing element (10) and delimited by the sealing element (10); and
removing from the mold (30) the sealing element (10) and the at least one line (40) received therein and overmolded in a region.

8 Claims, 5 Drawing Sheets

(51) Int. Cl.
*B33Y 80/00* (2015.01)
*B29L 31/36* (2006.01)

(56) References Cited

U.S. PATENT DOCUMENTS

| | | |
|---|---|---|
| 2005/0191897 A1 | 9/2005 | Kondou et al. |
| 2006/0207092 A1 | 9/2006 | Perle et al. |
| 2017/0187144 A1* | 6/2017 | Katsube ............ H01R 13/5216 |

FOREIGN PATENT DOCUMENTS

| | | | | |
|---|---|---|---|---|
| DE | 202011003443 | | 2/2012 | |
| DE | 102014226335 | | 6/2013 | |
| DE | 202012009598 | | 2/2014 | |
| DE | 102013006944 | | 10/2014 | |
| DE | 102013006944 A1 | * | 10/2014 | ........... H02G 15/013 |
| GB | 967041 | * | 2/1963 | |
| GB | 967041 | | 8/1964 | |
| JP | S5321791 A | | 8/1976 | |
| JP | H0538769 A | | 7/1991 | |

* cited by examiner

METHOD FOR OVERMOLDING AT LEAST ONE LINE

RELATED APPLICATION

The present invention claims priority of DE 10 2017 219 923.7, filed on 9 Nov. 2017, the entirety of which is incorporated herein by reference.

TECHNICAL FIELD

The disclosure relates to a method for overmolding at least one line, and also to a sealing element and to a use of a sealing element for sealing at least one line during the overmolding of the at least one line in a region.

BACKGROUND ART

Such overmolding serves to seal the at least one line in a region and, by means of the overmolding that is produced, to permit subsequent connection to a rear housing portion (the so-called "backshell") of a connector element facing the overmolded region. An overmolding can here refer to a jacket of a solid material of an injection-molding, casting or foam compound which has been produced by overmolding and encloses the at least one line completely. For example, a material of the overmolding can be so chosen that an adhesive and/or material-bonded connection between the overmolding and the jacket of the at least one line is formed.

Within the meaning of the disclosure, the at least one line can describe, for example, an individual line, a plurality of individual lines and/or a bundle of lines. A line can comprise at least one electrical conductor and a line insulation, or cable jacket, surrounding it.

It is known from the prior art to seal lines by means of an overmolding in a region which faces a connector element during subsequent operation, in order, for example, to protect an electrical contact region of the line and of the connector element from environmental influences, spray, etc. More precisely, the cable jacket of the line is frequently to be reliably protected against moisture in the described region in a longitudinal direction.

An overmolding of a line is produced in the prior art by means of, for example, an injection (molding) or foaming process. To that end, at least the region of the line that is to be overmolded is inserted into a mold. The mold is then closed and aninjection-molding, casting or foaming compound is introduced into the mold.

In today's applications, however, the lines or bundles of lines that are to be overmolded have increasingly more complex peripheral geometries in respect of their respective (overall) cross-section. The peripheral geometries of the lines or bundles of lines that are to be overmolded can also vary greatly from one another, depending on the type of line and the number of lines or the connector element to be connected thereto. This is the case in particular with connector systems having a plurality of lines, such as, for example, QSFP-DD to 8×SFP+, QSFP DD to 4×QSFP and QSFP to 4×SFP.

There is accordingly a need to provide a flexible and inexpensive method for overmolding at least one line which allows the at least one line to be securely sealed.

DISCLOSURE OF THE INVENTION

To that end there is proposed a method for overmolding at least one line having the features of patent claim 1. There are further proposed a sealing element for sealing at least one line having the features of patent claim 11 and a use of a sealing element for sealing at least one line having the features of patent claim 12. Further possible embodiments will become apparent from dependent claims 2 to 10 as well as from the description that follows.

According to a first aspect there is provided a method for overmolding at least one comprising the steps:

- receiving the at least one line in an opening of a sealing element, wherein the opening of the sealing element is substantially complementary in shape to a peripheral geometry of the at least one line;
- mounting the sealing element with the at least one line received therein on a mold;
- overmolding the at least one line received in the sealing element in a region that is adjacent to the sealing element and delimited by the sealing element; and
- removing from the mold the sealing element and the at least one line received therein and overmolded in a region.

For receiving the at least one line, the line can be introduced into the opening of the sealing element or, in other words, guided through the opening. The opening of the sealing element can extend, for example, in the thickness direction of the sealing element. It will be appreciated that the at least one line received in the opening of the sealing element can thus be in contact with a portion of the sealing element, that is to say with an inner peripheral surface of the sealing element formed by the opening. The inner cross-sectional surface of the sealing element formed by the opening can be substantially congruent to the cross-sectional surface of the at least one line. Alternatively, the inner cross-sectional surface of the sealing element formed by the opening can have the same geometric form as the cross-sectional surface of the at least one line but be slightly smaller than that cross-sectional surface, in order to clamp slightly the at least one line received therein. A tight fit between the at least one line and the sealing element can thereby be achieved. By making the opening of the sealing element substantially and at least in part complementary in shape to the peripheral geometry of the at least one line, the at least one line can not only be fixed but, in the case of a plurality of lines and/or a bundle of lines, can also be arranged in a predetermined manner.

The step of mounting the sealing element on the mold can at the same time comprise fixing and/or positioning the sealing element relative to the mold.

In a further development of the method, the sealing element with the at least one line received therein can be mounted on the mold. Accordingly, by means of the mounting step, an at least one line already received in the sealing element can at the same time be arranged, oriented and/or positioned relative to the mold. For example, the region of the at least one line that is to be overmolded can thereby be arranged in a cavity of the mold.

It will accordingly be appreciated that the at least one line can be introduced into the opening of the sealing element before the sealing element with the at least one line received therein is mounted on the mold. Alternatively, the sealing element can first be mounted on the mold and then the at least one line can be received in the opening of the sealing element. In both cases, atter the receiving and mounting steps, the at least one line, the sealing element and the mold are fixedly positioned, that is to say arranged and/or oriented, relative to one another.

The basic construction of a mold for producing an overmolding of at least one line is known to the person skilled in the art from the prior art and is therefore not described in detail here. Therefore, only specific features of the mold disclosed herein are discussed hereinbelow.

The sealing element is mounted and arranged on the mold in such a manner that, in a closed state of the mold, it delimits the cavity on at least one side, or in one direction. If the injection-molding, casting or foaming material for overmolding a region of the at least one line is introduced into the cavity, the sealing element delimits on one side the region of the at least one line that is overmolded. In other words, the overmolding that is to be produced is delimited at least by the peripheral surfaces of the cavity of the mold and by the sealing element.

By delimiting the overmolding and also by fixing and arranging the at least one line by means of the sealing element, a tight and clean ovemolding can be ensured. Accordingly, even lines and/or bundles of lines with complex peripheral geometries or complex line arrangements, which, for example, have undercuts that are to be overmolded, can be overmolded in the designated region reliably and in a sealed manner. For example, an optimal connection of the at least one line that is to be overmolded to a SFP (=small form-factor pluggable), a QSFP (=quad small form-factor pluggable), a QSFP-DD (=quad small form-factor pluggable double density) connector element or the like can thus be ensured.

In one embodiment, the method can comprise the further step: removing the sealing element from the at least one line that has been overmolded in a region. It will be appreciated that the sealing element can hereby be removed from the at least one line or the at least one line can be removed from the sealing element without damaging the at least one line. The sealing element thus does not remain on the line during operation of the at least one line but is merely used as an aid in the production process or preparation process thereof.

In a further development, the sealing element can be broken in order to remove it from the at least one line that has been overmolded in a region. In this case, the sealing element is intended for single use only. It is accordingly possible to provide a separate sealing element for each overmolding of a line that is to be overmolded or of a bundle of lines that is to be overmolded.

For example, it may be necessary to break the sealing element after the at least one line has been overmolded because pulling the sealing element off over the entire length of the line could cause damage to the line jacket. In some cases it may also be impossible to pull the sealing plate off the at least one line because the at least one line may already be mounted or terminated at the end (at an end remote from the overmolding).

In one embodiment, the sealing element can have at least one predetermined breaking point for removal by breaking. A base body of the sealing element can have as small a material thickness as possible overall, so that it can be broken in a simple manner, for example with or without the aid of a cutter.

Alternatively to the removal of the sealing element by breaking the sealing element, the sealing element can also be in a form such that it can be opened and closed for receiving the at least one line and opened again for subsequent removal. To that end, a portion of the sealing element can be pivotable relative to another portion of the sealing element. The sealing element can also have a locking or holding mechanism, for example, for opening and closing. In this case, the sealing element can be used multiple times.

In one embodiment, the sealing element can be in plate form. In other words, the sealing element can be a sealing plate. The opening of the sealing element can extend in the thickness direction of the sealing element. The sealing plate can have, for example, a substantially rectangular or square outer cross-section.

In a further development of the method, the sealing element, for mounting on the mold, can be introduced at least in part into a sealing element holder formed on the mold. The sealing element can be received and held in the sealing element holder by a friction-based and or interlocking connection. The sealing element holder can be substantially complementary in shape to a portion of the sealing element. For example, if the sealing element is in the form of a sealing plate, the sealing element holder can be a slot or slit in the mold. The sealing element holder is so arranged and formed on the mold that the sealing element mounted thereon delimits the cavity of the mold on at least one side.

In one embodiment, the sealing element can be a plastics component. In other words, the sealing element can be made predominantly or completely of plastics material. The material can be chosen inter alia according to the desired strength and/or thermal conductivity properties.

Within the context of the described method, or independently thereof, the sealing element can be produced by means of an additive, or generative, manufacturing process. The form, that is to say the shape and dimensions, of the sealing element, including the opening thereof, can thereby be adapted quickly and flexibly to different line geometries, line structures, to the number of lines and/or to varying line diameters. For example, the sealing element can be produced by means of a 3D printing process.

Alternatively to additive manufacture, the sealing element can be produced within the context of the described method, or independently thereof, by means of an injection molding process. Such a production process can be used, for example, for the mass production of sealing elements and is less expensive than additive manufacturing processes. In the case of injection molding, plastics materials, PCB materials, etc., for example, can be provided.

In one embodiment, the mold can comprise a metallic material, in order to dissipate heat during overmolding. The mold can thus be made of metal at least in a region in which the sealing element is mounted, that is to say, for example, in the region of the sealing element holder. A sealing element made of plastics material can thus be prevented from melting as a result of the heat input during overmolding, which could adversely affect the fixing and delimitation of the at least one line as well as subsequent removal.

In a further development of the method, at least two lines can be overmolded, wherein the opening of the sealing element comprises at least one opening portion. In the receiving step, one of the at least two lines is introduced into the at least one opening portion and thereby fixed in a designated position relative to the sealing element. A friction-based and/or interlocking connection can thereby already be formed between the at least one opening portion and the one of the at least two lines, so that the one of the at least two lines is held by the at least one opening portion and oriented and fixedly arranged relative to the sealing element. This facilitates the introduction or receiving of further lines into/in the opening of the sealing element. The at least one opening portion can be substantially and at least in part complementary in shape to an outer periphery of the one of the at least two lines. It will be appreciated that more than two lines can be provided for receiving in the sealing element, it being possible for the sealing element to comprise a plurality of opening portions of the above-described type. At least some of all the lines that are to be received can thus be introduced one after the other into the opening of the sealing element, the lines that have already been introduced being positioned and fixed as described above by the respective associated opening portions.

It will be appreciated that the method can comprise, before, between and/or after the described method steps, further steps which are carried out in conventional methods for overmolding lines or bundles of lines.

A further aspect relates to a sealing element for sealing at least one line during the overmolding of the at least one line in a region. The sealing element comprises a base body having an opening which is substantially complementary in shape to a peripheral geometry of the at least one line, for receiving the at least one line. The sealing element is so dimensioned and is in such a form that it can be mounted on a sealing element holder of a mold.

A further aspect relates to a use of a sealing element for sealing at least one line during the overmolding of the at least one line in a region. The sealing element comprises a base body having an opening which is substantially complementary in shape to a peripheral geometry of the at least one line, for receiving the at least one line. The sealing element can further be mounted on a mold.

Although some aspects and features have been described only in relation to the method for overmolding at least one line, such aspects and features can apply correspondingly to the sealing element and/or to the use of a sealing element as well as to further developments thereof.

BRIEF DESCRIPTION OF THE DRAWINGS

The present disclosure will be explained in greater detail by means of figures. The figures show schematically.

DETAILED DESCRIPTION

In the following, specific details are explained, without being limited thereto, in order to provide a complete understanding of the present disclosure. However, it will be clear to a person skilled in the art that the present disclosure can be used in other embodiments which may differ from the details set out hereinbelow.

Figure 1:
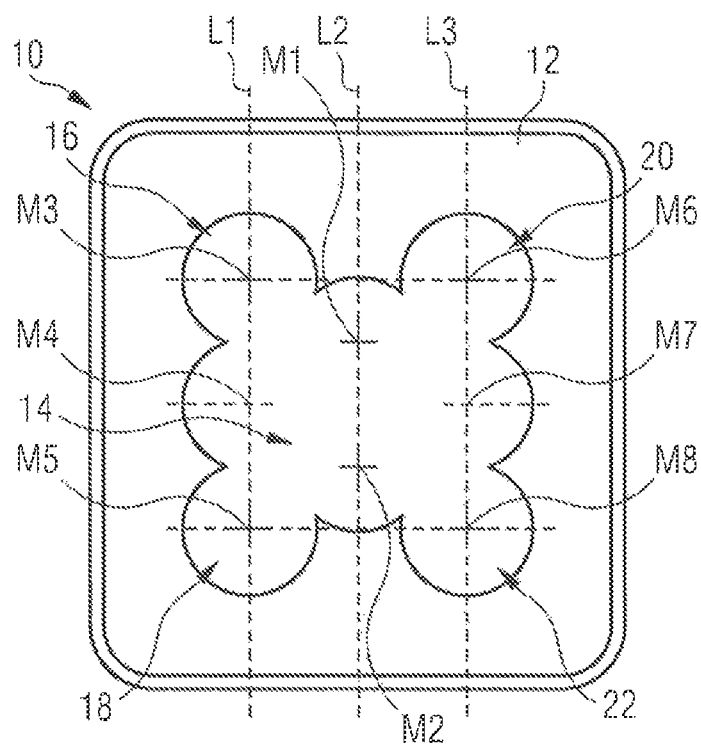
FIG. 1 a side view of an embodiment of a sealing element.
Figure 2:
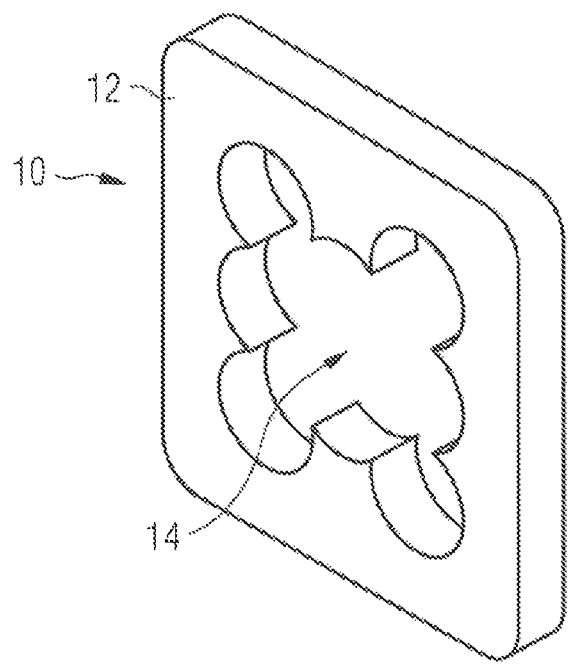
FIG. 2 a perspective view of the sealing element of FIG. 1.

FIGS. 1 and 2 show a side view and a perspective view of an embodiment of a sealing element 10. The sealing element 10 shown can be used in a method for overmolding at least one line (not shown in FIGS. 1 and 2), for example a bundle of lines.

In the embodiment shown, the sealing element 10 is a sealing plate having a base body 12 in plate form which has a substantially square outer periphery with rounded edges. The sealing element 10 comprises an opening 14 which extends through the entire base body 12 in the thickness direction of the sealing element 10. The opening 14 is arranged in the middle of the base body 12, that is to say a minimum distance between the contour of the opening and the outer contour of the sealing element 10 is approximately the same on each side.

The opening 14 is complementary in shape to a bundle of lines having eight lines that is to be received therein. Accordingly, the geometry of the contour of the opening 14 shown in a top view in FIG. 1 corresponds to the geometry of the outer periphery of the cross-section of the bundle of lines that is to be received therein.

The individual lines of the bundle of lines that are to be received each have a circular cross-sectional surface with the same diameter. In order to illustrate the arrangement of the lines of the bundle of lines, the mid-points M1 to M8 of the lines are indicated in FIG. 1, although the lines that are to be received are not shown for reasons of clarity.

As is apparent from the shape of the complementary opening 14, the bundle of lines that is to be received here has an arrangement of lines, or is to have an arrangement of lines, in which two mutually adjacent and touching lines whose mid-points M1 and M2 lie on a first line L1 are arranged in the middle of the bundle of lines. These two lines are here referred to as inside lines.

On the left side shown in FIG. 1 and on the right side shown in FIG. 1 of the first ine L1 of inside lines there are arranged in each case three lines whose mid-points M3 to M5 and M6 to M8 each lie on a further line L2, L3. The further lines L2, L3 are arranged parallel to the first line L1. The middle line of the three lines lying on a further line L2, L3 touches the two adjacent lines. Furthermore, those two middle lines touch each of the two inside lines, whereas the two outer lines of the three lines lying on a further line L2, L3 each touch only one of the two inside lines. Accordingly, the three lines to the right of the inside lines and the three lines to the left of the inside lines are arranged offset in respect of their mid-points both in the vertical direction and in the horizontal direction. It will be appreciated that bundles of lines with different arrangements and/or numbers of lines are also possible in further embodiments.

The opening 14 is always complementary in shape to the line or bundle of lines that is to be received. It should be noted that the gaps in the opening 14 of the sealing element 10 that form between the lines of the bundle of lines are not visible because the sealing element 10 comprises a single opening 14, the cross-section of which is congruent to the cross-section of the bundle of lines consisting of lines and gaps.

The opening 14 of the sealing element 10 shown in detail in FIGS. 1 and 2 comprises four opening portions 16, 18, 20, 22, into each of which a line of the bundle of lines can be introduced and fixed in a designated position relative to the sealing element 10 by means of the associated opening portion 16, 18, 20, 22. If a line is introduced into the associated opening portion 16, 18, 20, 22, it is in contact in the region of the sealing element 10 with the inner periphery of the sealing element 10, more precisely of the respective opening portion 16, 18, 20, 22, over at least three quarters of its periphery. This line that has been introduced is thus held by the at least one opening portion 16, 18, 20, 22 and oriented and fixedly arranged relative to the sealing element 10. This facilitates the introduction or receiving of the further lines into/in the opening 14 of the sealing element 10.

Figure 3:
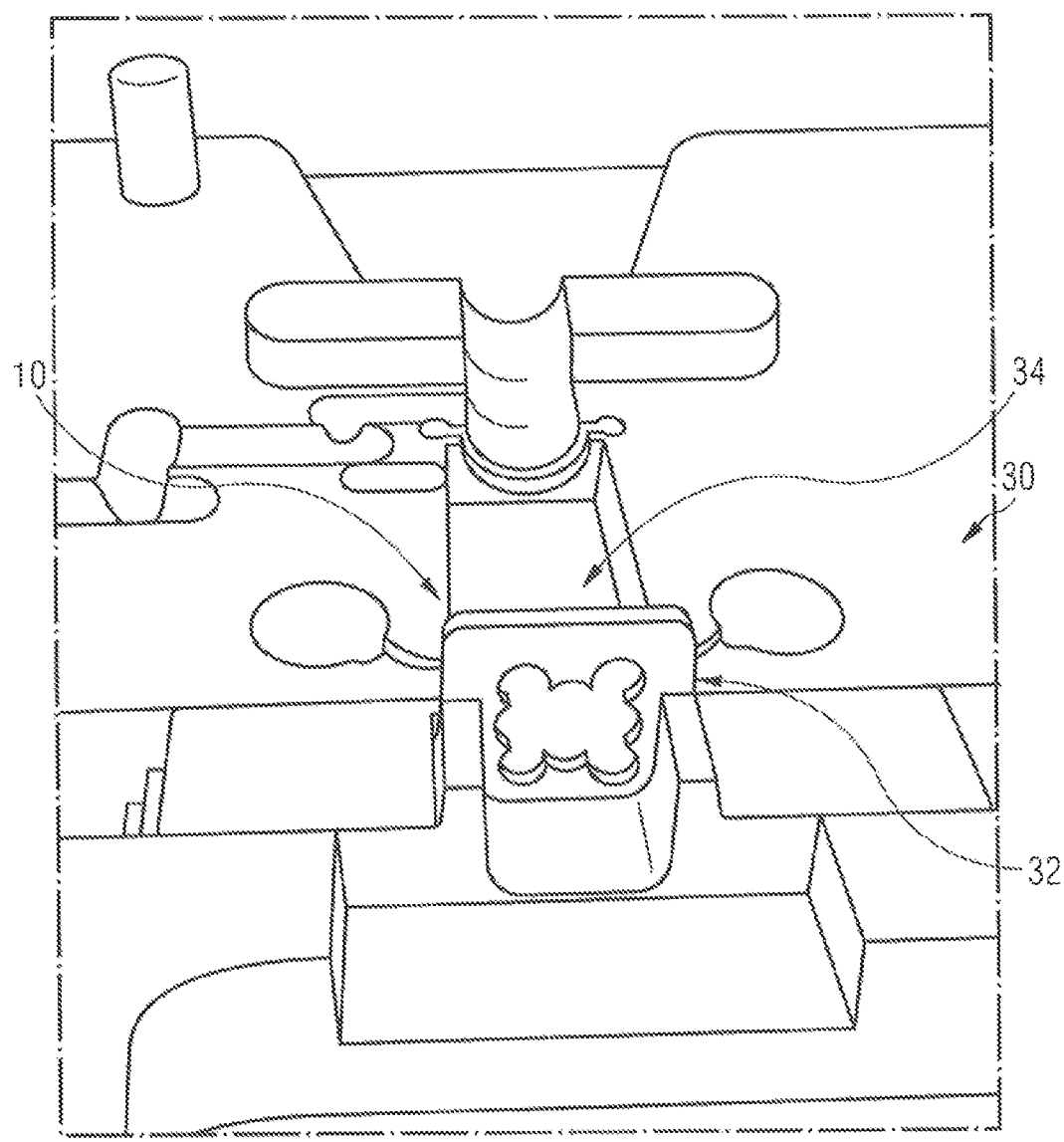
FIG. 3 a perspective view of an embodiment of a mold having a sealing element of FIG. 1 mounted thereon.
Figure 4:
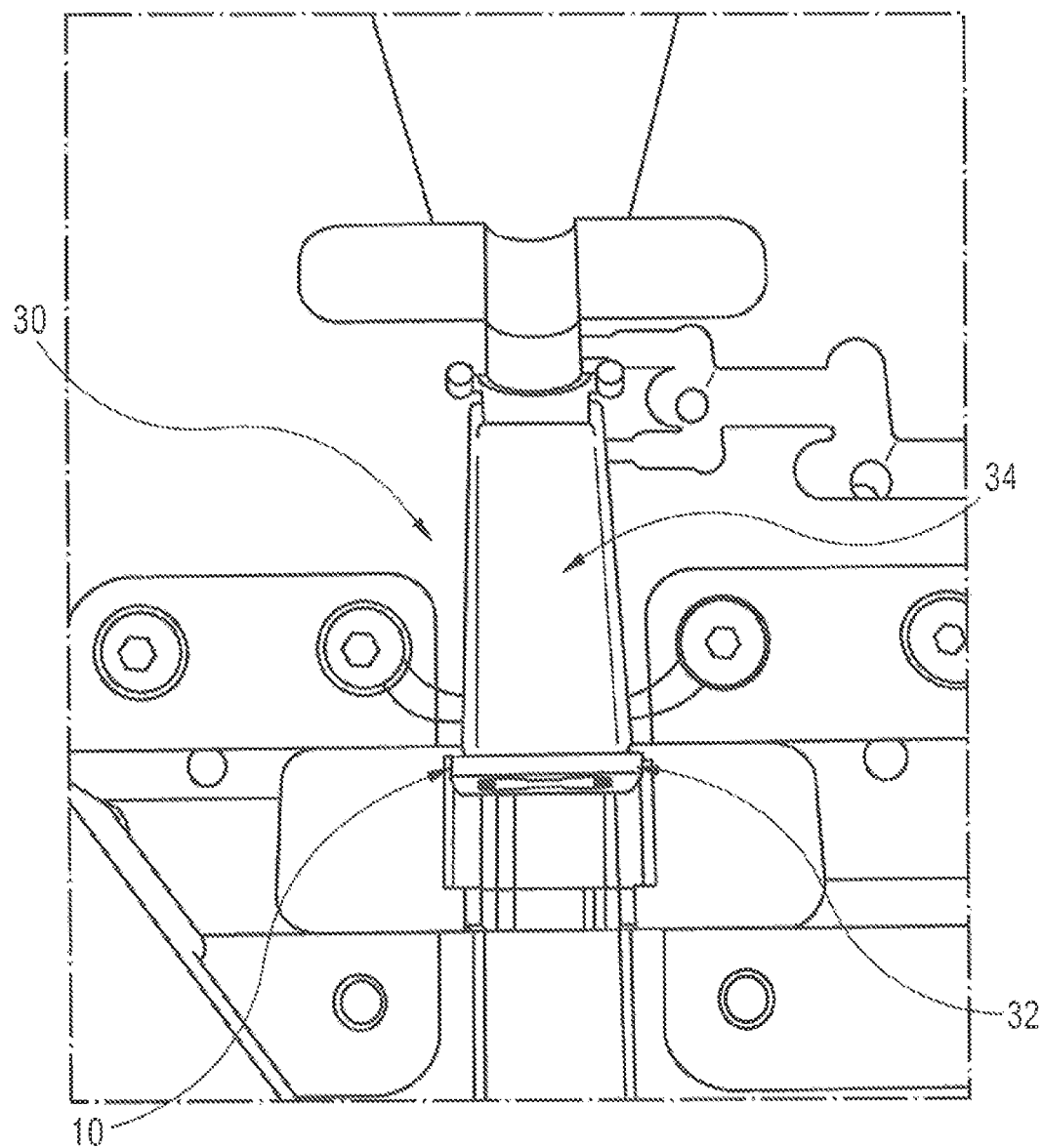
FIG. 4 a top view of the mold of FIG. 3 with the sealing element of FIG. 1 mounted thereon.
Figure 5:
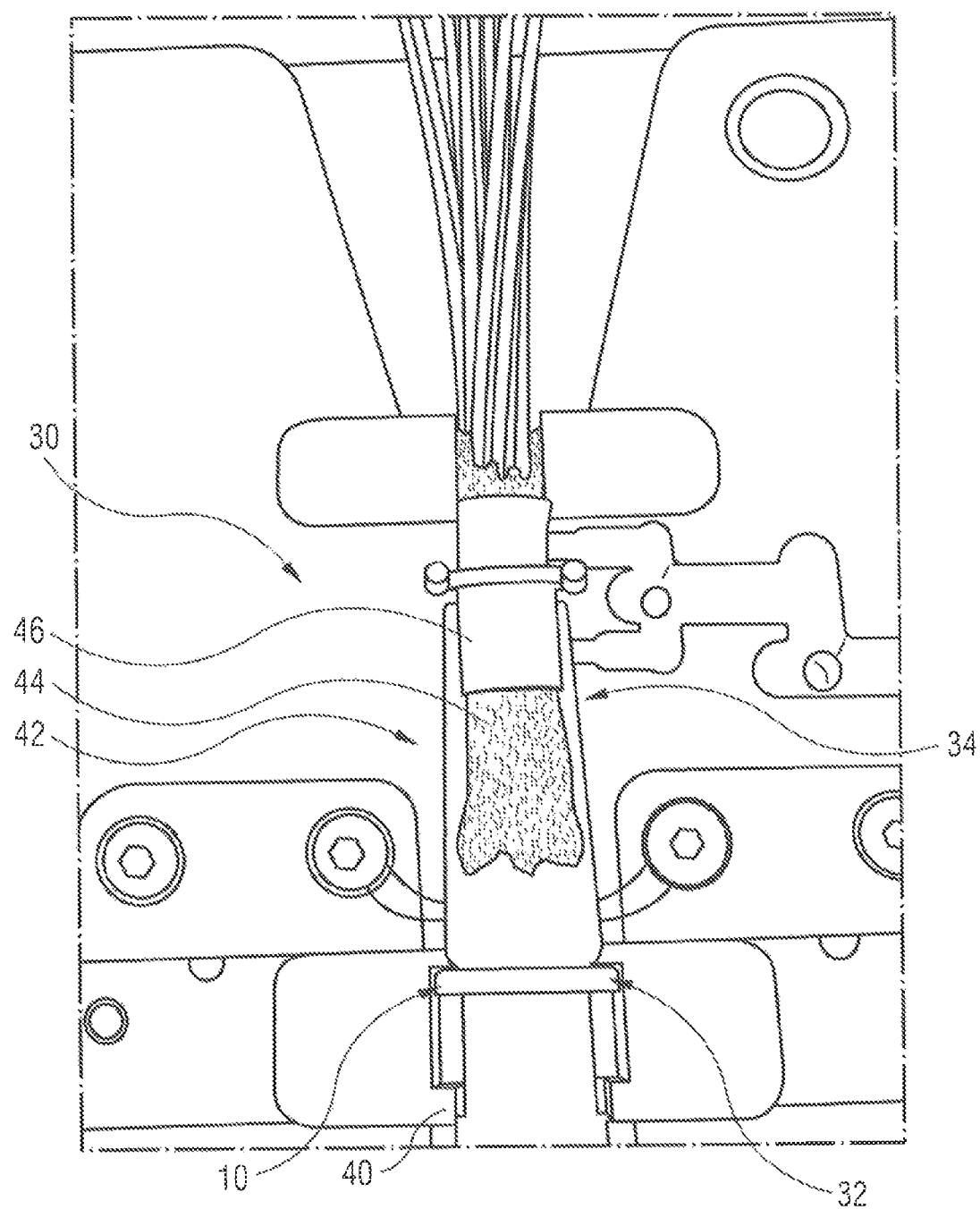
FIG. 5 a top view of the mold of FIG. 3 with the sealing element of FIG. 1 mounted thereon and a bundle of lines.

FIGS. 3 to 5 show the bottom part of a mold 30 with a sealing element 10 mounted thereon. The construction of the mold 30 corresponds substantially to the basic construction of known molds for the overmolding of lines and is therefore not described in detail here.

In contrast to known molds, the mold 30 shown in FIG. 3 has a sealing element holder 32. This is in the form of a slit and is complementary in shape to the sealing element 10 or sealing plate. The sealing element 10 is received in the sealing element holder 32 in each of FIGS. 3 to 5. As a result of the interlocking connection of the sealing element 10 with the sealing element holder 32, the sealing element 10 is fixedly held in the designated position during operation. In other words, by being introduced into the sealing element holder 32 of the mold 30, the sealing element 10 is positioned relative to the mold 30 and thus also relative to a cavity 34 of the mold.

Introducing the sealing element 10 into the sealing element holder 32 delimits the cavity 34, as can be seen in FIGS. 3 to 5. An injection-molding, casting or foaming material supplied to the cavity 34 for overmolding a region of a line, or here of a bundle of lines, arranged in the cavity 34 can accordingly spread in the cavity 34 only as far as the sealing element 10, more precisely as far as the face of the sealing element 10 facing the cavity 34. This is described in greater detail hereinbelow with reference to the associated method step.

FIG. 5 likewise shows the bottom part of the mold 30. However, in contrast to FIGS. 3 and 4, a bundle of lines 40 of the above-described type comprising eight individual lines is shown, which bundle of lines is received in the opening of the sealing element 10 and extends through the cavity 34 of the mold 30. By fixing the bundle of lines 40 by means of the sealing element 10 mounted on the sealing element holder 32 of the mold 30, the bundle of lines 40 is oriented as intended relative to the cavity 34 of the mold 30. A region 42 of the bundle of lines 40 that is to be overmolded is thus arranged in the cavity 34. It will also be seen that the region 42 of the bundle of lines 40 that is to be overmolded is provided in conventional manner with further additional elements, such as, for example, a cable sheath 44 and a sleeve 46. These additional elements are likewise to be included in the overmolding.

In FIG. 5, the opening of the sealing element 10 is completely filled by the bundle of lines 40, so that there is no void or gap between the sealing element 10 and the bundle of lines 40 in the region of the opening. The cavity 34 is accordingly delimited completely on one side by the sealing element 10 and the bundle of lines received therein. If injection-molding, casting or foaming material is injected into the cavity 34 for overmolding the region 42 of the bundle of lines 40, it is distributed evenly and optimally around the components that are to be overmolded. This is the case, despite the comparatively complex structure of the bundle of cables 40, also for the region of the bundle of cables 40 that is adjacent to the sealing element 10 inside the cavity 34, in which the bundle of cables, due to the described arrangement of the eight lines, has undercuts that are to be overmolded.

Having regard to the above explanations of the described components, an embodiment of a method for overmolding the bundle of lines 40 is described hereinbelow.

In this method, the sealing element 10 is provided in a first step.

Then, in a second step, the bundle of lines 40 is received in the opening 14 of the sealing element 10. To that end, the eight individual lines are introduced one after the other into the opening (inter alia into opening portions 16, 18, 20, 22), which is complementary in shape to the peripheral geometry of the bundle of lines 40. The bundle of lines 40 is thereby arranged as intended so that, after introduction into the opening 14, the eight lines are fixed and arranged relative to one another and also fixedly positioned relative to the sealing element 10.

In a subsequent third method step, the sealing element 10 together with the bundle of lines 40 received therein is inserted into the sealing element holder 32 of the mold 30, so that the sealing element 10 and the sealing element holder 32 are in engagement with one another (see FIG. 5). In this third step, the sealing element 10 and the bundle of lines 40 received therein is positioned relative to the mold 30. The bundle of lines 40 is thereby also oriented as desired, the region 42 that is to be overmolded being arranged, as is shown in FIG. 5, in the cavity 34.

Between the second and third steps, the additional components such as the cable sheath 44 and the sleeve 46 can be arranged on the bundle of lines 40 in an intermediate step. Alternatively, this can also be carried out before the start of the method described herein. In the last-mentioned case, the lines are accordingly to be guided through the opening of the sealing element with an opposite end.

It will further be appreciated that the order of steps two and three can be reversed. Thus, the sealing element can first be mounted on the mold, the bundle of lines only thereafter being received in the opening of the already mounted and thus positioned sealing element.

In a fourth step, the mold 30 is closed, that is to say the top part of the mold 30 is placed on the bottom part shown in FIGS. 3 to 5. The cavity 34 is thereby closed on all sides.

In a fifth step, the cavity 34 is filled with plastics injection-molding, casting and/or foaming compound via a nozzle. This compound is distributed evenly in the cavity 34 around the components that are to be overmolded of the region 42 of the bundle of lines 40 that is adjacent to the sealing element 10 and delimited by the sealing element 10.

After cooling, the mold 30 is opened and the sealing element 10, together with the bundle of lines 40 overmolded in a region, is removed from the mold 30 in a sixth step.

In a subsequent seventh method step, the sealing element 10 is removed from the bundle of lines 40 overmolded in a region by breaking the sealing element 10. It is hereby to be ensured that the individual lines of the bundle of lines, or their respective cable jackets, are not damaged.

Figure 6:
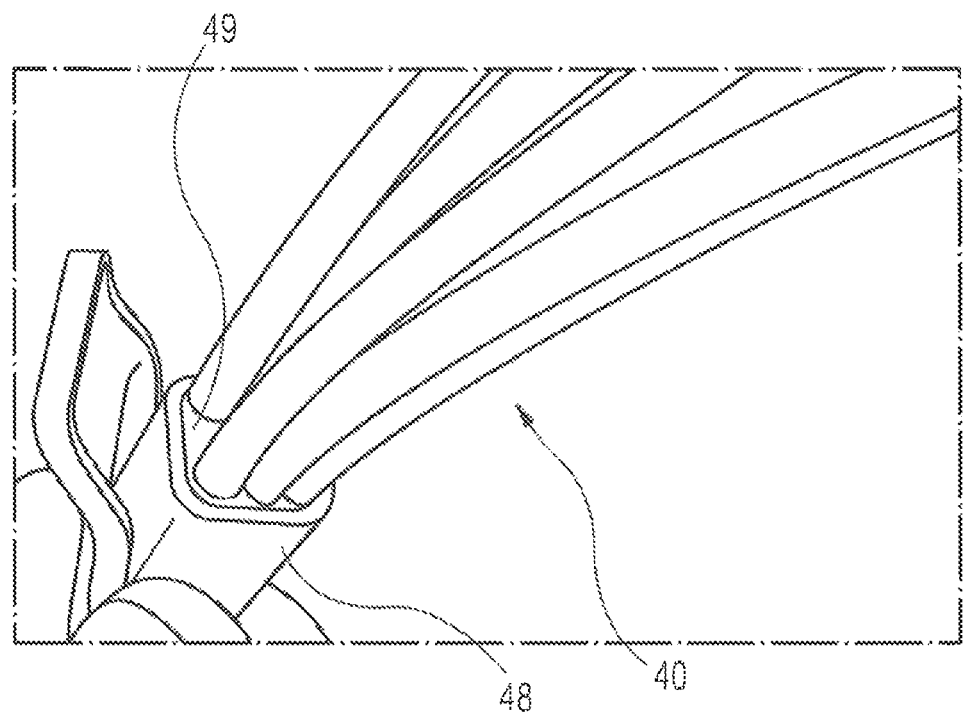
FIG. 6 a perspective view of an embodiment of a bundle of lines attached to a connector element.
Figure 7:
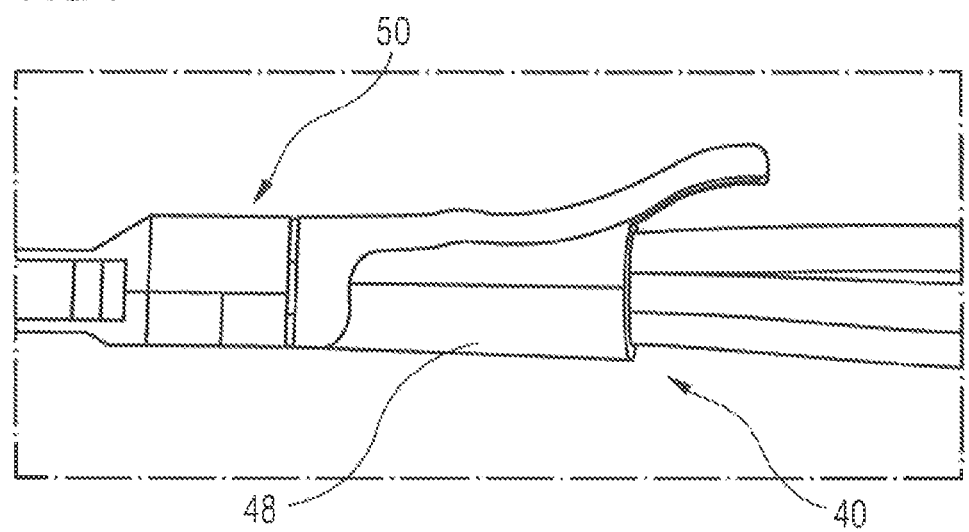
FIG. 7 a side view of the bundle of lines of FIG. 6 attached to a connector element.

A bundle of lines 40, comprising an overmolding 48, which has been produced by means of the above-described method is shown in FIGS. 6 and 7. In the representation shown, the bundle of lines 40 is attached in the region of the overmolding 48 to a connector element 50. As can be seen in FIG. 6, for example, the overmolding 48 has a flat end face 49 produced by means of the sealing element 10, from which flat end face the individual lines of the bundle of lines 40 emerge. The overmolding is distributed evenly around the individual lines of the bundle of lines 40 and encloses them in a sealed manner.

Although the invention has been described with a certain degree of particularity, those skilled in the art can make various changes to it without departing from the spirit or scope of the invention as hereinafter claimed.

The invention claimed is:

1. A method for overmolding at least one line, said line including at least one electrical conductor and an insulation jacket, said method comprising the steps:
   receiving the at least one line in an opening of a sealing element, wherein the opening of the sealing element is substantially complementary in shape to a peripheral geometry of the at least one line;
   mounting the sealing element on a mold;

overmolding the at least one line received in the sealing element in a region that is adjacent to the sealing element and delimited by one side of the sealing element, said sealing element being removable from said at least one line after said one line is overmolded;

removing from the mold the sealing element together with the at least one line received therein and overmolded in a region; and, removing the sealing element from the at least one line that has been overmolded in a region.

2. The method as claimed in claim 1, wherein the sealing element is broken in order to remove it from the at least one line that has been overmolded in a region.

3. The method as claimed in claim 1, wherein the sealing element is in plate form.

4. The method as claimed in claim 1, wherein the sealing element, for mounting on the mold, is introduced at least in part into a sealing element holder formed on the mold.

5. The method as claimed in claim 1, wherein the sealing element is a plastics component.

6. The method as claimed in claim 1, wherein the mold comprises a metallic material for dissipating heat during overmolding.

7. The method as claimed in claim 1, wherein at least two lines are overmolded, wherein the opening of the sealing element comprises at least one opening portion, and wherein, in the receiving step, one of the at least two lines can be introduced into the at least one opening portion and thereby fixed in a designated position relative to the sealing element.

8. The method as claimed in claim 1 wherein said sealing element is intended for single use only and is removed from said at least one line by breaking it.

\* \* \* \* \*